2,989,898
METHOD OF REDUCING SLIDING FRICTION AND ITS APPLICATION TO FIREARMS

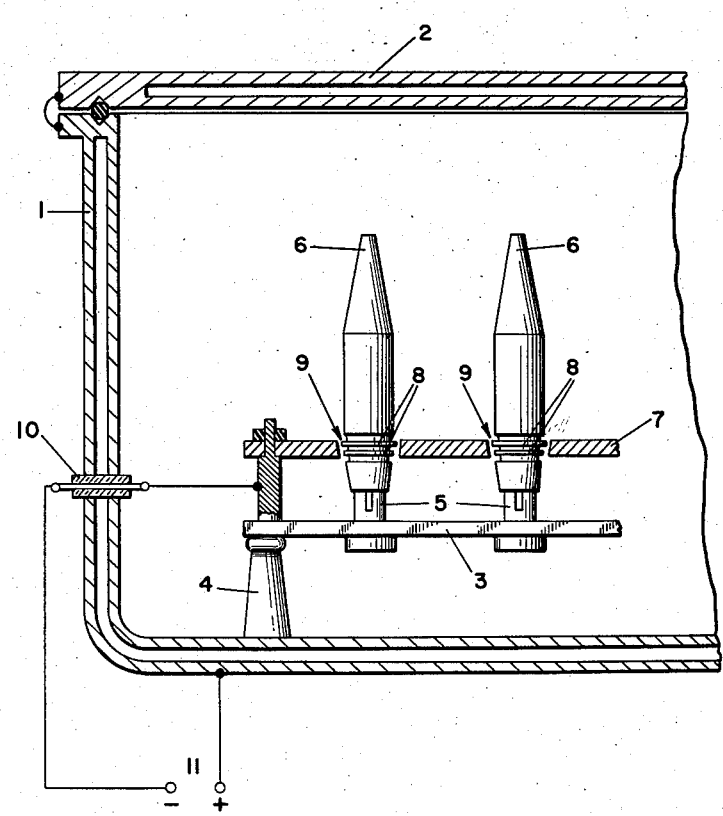

Hans Bucek, Zurich, Switzerland, assignor to Elektrophysikalische Anstalt Bernhard Berghaus, Vaduz, Liechtenstein
Filed Nov. 23, 1956, Ser. No. 624,121
Claims priority, application Switzerland Nov. 26, 1955
3 Claims. (Cl. 89—1)

The present invention relates to measures designed to reduce sliding friction between two metal surfaces sliding on one another with high contact pressure, by providing a gas layer forming a lubricant film between the said surfaces.

It has for some time been known that a gas layer between such metal surfaces sliding on one another with a high pressure per unit area can substantially reduce friction. This is particularly important in cases where owing to extraneous circumstances, such as the high temperature of the two metal elements, other lubricants for the reduction of friction can no longer be employed and where so-called self-lubricating substances, such as metals containing graphite, cannot be employed for reasons of strength.

Naturally a normal unprepared sliding surface is not in a condition to maintain a gaseous lubricant film over extended periods since a certain gas loss owing to diffusion into the associated surfaces and by migration towards the edges of the sliding surface parts cannot be avoided.

For this reason it has been suggested that the gas yield of a metal surface subject to sliding friction be increased by charging its surface with gases or by diffusing gasifiable substances into the said surface. Substances suitable therefor are phosphorus, sulphur, certain metals, oxygen and the like. By way of example, in gun barrels where extremely high surface pressures up to several thousand kilograms per square centimetre occur during firing and where the temperature may rise above 500° C., enrichment of the bore wall with nitrogen has proved very suitable as shown by the Swiss patent specification No. 308,295. While the prolongation of useful life there described largely rests on the improvement of the surface hardness and the formation of a non-splintering ductile nitrided steel surface, it may nonetheless be assumed that the gas cushion forming on the barrel surface enriched with nitrogen contributes to the said effect.

It has also been suggested to design the driving bands of the projectiles to be used for this purpose and to enrich them with gasifiable substances or charge their surfaces with gas, instead of the inner wall of the gun barrels, which are difficult to treat.

In extensive investigations of the metal surfaces sliding on one another under very high surface pressure, such as encountered in firearms, a reduction of sliding friction by enrichment either of the gun barrel or of the projectile driving bands with substances capable of gas formation has been obtained in certain cases; however, this reduction was mostly of short duration. The attempts at obtaining a more lasting reduction of sliding friction by controlling the degree of enrichment in the metal surfaces involved (depth distribution, concentration and the like) have been unsuccessful and proved to have only a small influence upon the maximum reduction of friction. It accordingly appeared unnecessary and unpromising to investigate more closely conditions obtaining in the use of projectiles enriched with substances capable of gas formation in likewise correspondingly treated gun barrels, in particular as such tests are exceptionally costly.

However, after establishing the facts described below, it was astonishing to find that a sudden reduction of sliding friction is possible by the method according to the present invention.

The method according to this invention for the reduction of sliding friction which employs a gas layer acting as a lubricant film is characterized by the fact that the gas layer formed only when the large stress occurs is supplied by all associated surface portions of the two metal surfaces, the necessary quantities of gas being supplied by gasifiable substances concentrated in the two metal surfaces and the adjacent underlying zones by means of electrical glow discharges.

According to the present invention, this method can be applied to particular advantage to firearms characterized in that gasifiable substances are diffused into the tubes or barrels at least in the portions of the inner walls contacted by the projectile as well as into the projectiles, at least in the portions designed to contact the said inner walls, the said diffusion being effected in an ionized gaseous atmosphere, and adapted to supply a gaseous lubricant film produced during the firing.

The firearm and the projectile according to this invention are characterized by an enrichment at least of the surface portions designed to contact one another and the adjacent underlying zones with substances capable of gas formation and derived from an ionized gaseous atmosphere, the said substances being of the type ensuring that the gases emitted under the pressures and temperatures produced in firing are compatible with one another and with their surroundings, and that their volumes are additive. As I have found, these added volumes, released from both of the relatively sliding surfaces, are sufficient to provide a lubricating film which reduces wear on the parts and so increases the life of the gun barrel.

The present invention is based on the knowledge gained in extensive tests with firearms that with all metal surfaces subject to sliding friction at such extreme pressures and temperatures not only the original formation of the gas layer serving as a lubricant film is of importance, but that even more the permanent preservation of the said gas layer when single shots are fired and during sustained fire represents a principal problem.

In the gun barrels which have had their inner walls enriched with nitrogen in an electric glow discharge and which have so far been employed with considerable success, the surface portions contacted by the projectile are fully in a condition to supply a quantity of gas sufficient for the formation of gaseous cushions. In the passage of normal projectiles of which the driving bands have not been treated, however, a certain quantity of gas is apparently consumed and the gaseous lubricant film is detrimentally reduced. It is assumed that already in firing single shots, in which the driving bands are heated at their sliding and deformed surfaces up to over 1000° C. in their travel from the chamber to the barrel muzzle, the friction-reducing gas layer is increasingly dissipated and consumed owing to the high temperature of the driving bands. The driving bands may at any rate cause a reduction of the gaseous lubricant film.

To this detrimental effect on the friction reducing gas layer occurring when individual shots are fired is added an impoverishment in gasifiable substances of the inner surfaces of the barrel contacted by the projectile with an increasing use of the gun barrel. This impoverishment is based, as far as it has been possible to ascertain, on the fact that owing to the heating of the inner barrel surface the gasifiable substances present therein, insofar as they do not emerge and form the desired gas film, will migrate into the deeper zones of the metal surface by diffusion. Since similar new substances of this type do not diffuse into the metal from the surface, the outermost metal layers become impoverished to a corresponding degree.

Conditions are somewhat different in the use of gas nitrided projectiles, which have been experimentally employed earlier, in normal, i.e. not specially treated, gun barrels. While the driving bands nitrided in the usual manner in baths or ovens were found to be able to supply a friction reducing gaseous envelope in the gun barrels at the beginning in the still cold condition, this advantageous gas film could not be maintained when firing was effected in rapid succession. Apparently consumption of the gases emerging from the driving bands by the heated inner barrel wall occurred far too rapidly for a gaseous lubricant film to be maintained.

The above explanations regarding the behaviour of metal surfaces treated with substances capable of gas formation and subject to sliding friction under extreme conditions, which should be regarded merely as working hypotheses, are the result of extensive firing tests. A working hypothesis of this type, which has resulted in the method according to this invention, could not be established to date because gun barrels enriched with gasifiable substances such as nitrogen and suitable for the present heavy requirements have not been available. The gun barrels nitrided in gas ovens or salt baths possess a brittle nitrided surface layer which tends to chip during firing, which results in a relatively short life and a gradual decrease of the muzzle velocity.

In gun barrels of this type, the improvement possibly obtained by a reduction of sliding friction is completely neutralized by the detrimental effects of the chipping surfaces. Only after creating hardened but ductile and largely non-chipping nitrided zones by treating the inner barrel surface in an electric glow discharge (see Swiss Patent No. 308,295) could the said working hpyothesis be established.

Contrary to the general technical views previously held in the field of firearm theory, the above disclosed knowledge made it appear promising to enrich both the inner barrel wall and the portions of the projectiles designed to contact the said inner wall with substances capable of gas formation in an electric glow discharge.

The comparative tests surprisingly revealed a sudden reduction of sliding friction beyond the extent formerly achieved, in optimum cases, over limited periods. In favourable cases, sliding friction was reduced by 80 to 90%.

The above working hypothesis makes these results appear understandable for the gas layer produced under conditions of high sliding friction is not supplied only by the one metal surface as hitherto and more or less absorbed by the other. On the contrary, all associated surface portions of both metal surfaces contribute to the supply of the gas layer. If the driving bands are heated in passing through the barrel when single shots are fired, they will nonetheless emit gas and no detrimental influence is exercised upon the friction reducing gas layer. On the other hand, the loss in the inner barrel wall of gasifiable substances is largely prevented since the driving bands supply corresponding substances part of which will diffuse into the heated inner barrel wall.

T prerequisite is that the gases emitted by the two metal surfaces subject to extreme stress will not react together in an undesirable manner but that they are compatible, at the temperature and pressure conditions prevailing, both with one another and with the explosion gases present. Both surfaces are advantageously enriched with the same gasifiable substances. However, different substances may be employed of which the gaseous components are compatible and which are additive in volume. Accordingly, the inner barrel wall must not be enriched with a gas forming substance the gas components of which will enter into a chemical combination with that of the driving bands, which would detrimentally affect the friction reducing gas layer or corrode the inner barrel wall. On the other hand, chemical combinations of the emitted gases and the explosion gases may be desirable if they will not detrimentally affect the gas layer.

Moreover it is of importance that the concentrations of the gas-forming substances present in the two metal surfaces are adjusted to one another. As the gun barrels must necessarily be nitrided in an electric glow discharge to obtain a hardened but ductile and non-chipping inner surface, it is recommended also to enrich the entire surface of the projectile, or at least such portions thereof as will be in contact with the inner barrel wall, with corresponding gas-forming substances in an ionized gas atmosphere.

The gas-forming substances may be concentrated in the uppermost zones of the metal surfaces as chemical compounds or form alloying constituents of the metals or form a solid solution with the metal respectively. By way of example, some of the compounds listed below have been examined in respect of their friction reducing properties and found suitable so that the entire group of substances may be assumed to be more or less suitable:

$FeO/Fe_2O_3/Fe_3O_4/Fe_2N/Fe_2P/Fe_3P/FeS/Fe_2S$;
$CuO/Cu_2O/Cu_3N/CuS/Cu_2S$;
$CrO/Cr_2O_3/CrN/CrO_3$;
$Al_2O_3/AlN/Al_2S_3$.

These substances naturally have different decomposition temperatures or boiling points (evaporation) so that a suitable selection must be made for the application required.

Apart from such chemical compounds metals or metalloids may naturally be employed as alloying constituents if they will evaporate when the metal surfaces are subjected to stresses and if they possess a sufficient vapour pressure, e.g. zinc, lead, chromium and the like.

In order to enrich portions of the surface of projectiles or their entire surface, or the driving bands thereof, the finished, degreased and thoroughly cleaned metal parts are arranged in an evacuable discharge vessel and connected with an exterior source of voltage via an insulated lead-in. In the simultaneous treatment of several such metal parts they may be connected in parallel to the same terminal or be connected together in groups each, connected with a separate insulated current lead-in. Furthermore, a counterelectrode is provided which is connected to the other terminal of the source of voltage via an insulated current lead-in, or the metallic discharge vessel is designed to act as the counterelectrode. A suitable arrangement of the workpieces connected as electrodes is described in the copending patent application of Hans Bucek, Serial No. 432,805, filed May 27, 1954, now Patent No. 2,824,210, and is so operated that a uniform temperature and a glow discharge of uniform intensity may be obtained at least at the surface portions subject to sliding friction.

For this purpose a suitable pumping device is employed to produce a sub-pressure in the range of .1 to 100 mm. Hg in the discharge vessel while a gas or gas mixture is at the same time supplied in controllable quantity so that a desired atmosphere of constant pressure and uniform composition is obtained. When a suitable direct, alternating or wave voltage is applied between the workpieces to be treated and the counterelectrodes, a glow discharge is obtained which should initially involve low transformation of energy owing to the application of low pressure and the lowest possible voltage. Gradual increase of pressure and voltage will steadily increase the energy conversion of the glow discharge and largely concentrate the said discharge, if desired, on the surfaces to be treated until the energy concentration of the glow discharge designed to transform the involved surface portions is obtained on the said surfaces. This starting period of the glow discharge is described in detail in the copending patent application of Bernhard Berghaus and Hans Bucek, Serial No. 473,895, filed December 8, 1954, now abandoned; in copending application of Bernhard Berghaus and Hans Bucek, Serial No. 579,934, filed April 23, 1956, now abandoned; and in copending applications of Bernhard Berghaus and Hans Bucek, Nos. 626,934, filed December 7, 1956, and 627,685, filed December 11, 1956. This starting process also causes the surace portions to be treated to be freed from absorbed or adsorbed foreign matter, from machining residues and from all impurities. At the beginning of the treatment phase proper, the surface is in a very clean condition, which is a prerequisite for the obtention of perfectly uniform surfaces. If desired, the starting process may be performed in a gas atmosphere of different composition from that employed in the actual glow discharge treatment, by way of example, in the presence of a reducing gas such as hydrogen. On termination of the starting process this gas is replaced by the gas or gas mixture selected for the actual treatment of the surfaces, which is charged into the discharge vessel advantageously while maintaining the sub-pressure desired and the existing glow discharge. If the gas desired for the starting process should not be mixed with the one selected for the subsequent treatment phase, the gas atmosphere of the starting process may be replaced by a protective gas atmosphere, such as a rare gas and the latter in turn replaced by the gas selected for the treatment phase.

The figure of the drawing is a view of apparatus used in treating projectiles. If it is desired to anneal and at the same time enrich the steel driving bands of steel projectiles with gasifiable substances, an arrangement according to the figure of the drawing may be employed. To this end, an evacuable, double-walled and coolable gas discharge vessel 1 having a removable lid 2 is provided with a metallic supporting plate 3 on insulators 4, the said plate being equipped with resilient metal bolts 5 on which the steel projectiles 6 to be treated can be slipped. Arranged parallel with the supporting plate 3 and conductively connected therewith is a metallic stop 7 lying in a plane with the driving bands 8 of the projectiles 6. This member is equipped with circular openings 9 through which the projectiles 6 project. The thickness of the stop 7 is so designed as to locate the inside of the openings 9 opposite the two driving bands 8. The inside of the said openings 9 must concentrically enclose the two driving bands 8 and form an annular gap with the latter which is of even width throughout.

The supporting plate and the stop 7 are connected to the negative terminal of the pair of terminals 11 via an insulated current lead-in 10, while the positive terminal is connected to the metallic discharge vessel 1. In the discharge vessel 1, 2 suitable means (not shown) are provided to produce a gas atmosphere consisting of 30% $N_2$ and 70% $H_2$ at a pressure of 5 to 10 mm. Hg, which is maintained during operation. On termination of the starting process referred to above a glow discharge of 400 to 500 volts is produced between the discharge vessel 1 and the projectiles 6 and the stop 7, which is at the same potential. If the annular gap between the driving bands 8 and the inner wall of the openings 9 is of suitable width, the glow discharge supplies a particularly high energy concentration in the gap of .1 to 10 watts/cm.$^2$ of surface of the driving bands in the said gap. This operational condition, which is termed "hollow-cathode effect," is described in detail in Swiss Patent No. 314,340 and the corresponding United States Patent No. 2,955,998 dated October 11, 1960. With this mode of operation, the driving bands 8 reach the desired glow temperature within a short space of time, such as .5 to 2 minutes, and will be enriched with nitrogen owing to the ion bombardment. The high energy density in the annular gap ensures a relatively rapid diffusion of the nitrogen, which is here atomic, into the driving bands so that the required depth of penetration is achieved after annealing, and treatment may be terminated. During the relatively short period of treatment, the other portions of the projectile 6 undergo a very slight increase of temperature so that strength is not affected.

During the diffusion of the gases used in the treatment into the metal surface, i.e. of the nitrtogen in the example under consideration, so-called mixed bodies are produced at a certain depth, which constitute chemical and physical combinations of metal and gas. Experience has shown that such mixed bodies emit the nitrogen again in the form of gas at the extreme temperature and pressure conditions obtained during firing.

During the treatment of metal surfaces in a glow discharge—even where the surfaces are not heated to glow temperature as in the above-cited example—the surface structure is modified by a material migration caused by the elimination of very fine metal particles from the surface zone. It is not known exactly whether the metal particles are removed from the crystalline arrangement owing to evaporation at the points where individual ions impinge or whether they are released through direct impact. At any rate material migration has been proved by experiments. At the same time material is added since the gas atmosphere is charged with metal particles originating from the surface of the workpiece itself or from the counterelectrode. Such metal particles are electrically charged and accelerated in the direction of the surface of the workpiece in the cathode fall space and there impinge with high kinetic energy.

The degree of material migration in the one direction or the other may be influenced by suitable selection of the geometrical arrangement of the workpiece and the counterelectrode as well as by the pressure in the discharge vessel and the type and polarity of the voltage. Discharge conditions are preferably so selected that the material migration preponderates. At any rate, a surface zone is produced on the metal body after the glow discharge of sufficient duration—which is only a few minutes in the above example but may be hours—has been maintained on the surface of the workpiece, the said zone possessing an extremely uniform micro-porosity which may be assumed to extend into molecular dimensions. At the same time the strength of this surface zone is not appreciably lower than in the untreated metal layers.

This micro-porous surface layer becomes intensively enriched with the gas present in the discharge vessel and retains this gas charge even after termination of the treatment at atmospheric conditions.

The surface is therefore enriched with gas in two respects after termination of the glow discharge treatment. On the one hand, nitrogen diffused into the metal layer is dissolved therein or combined in the form of mixed bodies. On the other hand, gaseous components are enclosed in the micro-porous surface layer. In the pressure and temperature conditions present during firing, both the gas charge and the mixed bodies contribute to the supply of the friction reducing gas layer between the surfaces sliding on one another. In respect of the driving bands, the gas charge may be operative at the beginning while deeper zones with mixed bodies will contribute substantially to the gas emission after deformation has begun.

According to the method described above for the treatment of the driving bands of projectiles the surfaces of workpieces of any shape and even very complex design subject to sliding friction may be provided with the micro-porous surface zones forming the subject-matter of this invention. Wider or narrow bores may have their inner surfaces treated in this manner, if necessary by means of a wire or pin-type counterelectrode arranged coaxially in the bore. It is a considerable advantage that the transformation of the surface zone may be effected after the workpiece involved is entirely completed since no deformation of the workpiece will occur owing to the uniformity of the heat treatment. The changes in dimension owing to material migration, if at all noticeable, can easily be determined with a sample piece and then allowed for in the previous machining of the workpiece since the glow discharge treatment is performed under conditions accurately reproduceable.

The transformation of metal surfaces according to the embodiment described is obviously not limited to steel objects but may be performed in all nonferrous metals and alloys, usually with different duration of treatment. In particular, very hard metals such as employed for friction clutches, gears, gear rims and the like may be equipped with a micro-porous surface zone according to this invention and enriched with substances capable of yielding gases.

Naturally numerous substances other than the above-described nitrogen-metal mixed bodies may be employed depending on the particular application. By way of example the metal surfaces may be enriched with phosphorus or with sulphur either in elemental form, dissolved in the metal concerned, as mixed bodies, or in the form of compounds. Such substances will evaporate at the extreme pressure and temperature conditions obtaining and form the friction reducing gas layer. Other gases, such as hydrogen, oxygen and, under certain circumstances, even rare gases may be concentrated in the metal surfaces subject to sliding friction so that they may contribute to the supply of a friction reducing gas layer.

The substances to be concentrated in the metal surfaces may largely be drawn from the gas present in the discharge vessel as in the examples described above. Naturally such gasifiable substances may be introduced into the glow discharge on the surfaces of the workpieces to be treated in some other manner.

By way of example, a suitable substance may be evaporated in the discharge vessel and mixed with the gas atmosphere or a mist formed of particles of such substances may be injected. Moreover, the known process of cathode evaporation or arc disintegration may be employed in order to mix particles of foreign matter with the gas atmosphere.

It may further be mentioned that the friction reducing gas envelope in firearms is advantageous also owing to the excellent sealing of the projectile in the barrel. In addition, the friction reducing gas layer produced appears to form a protective coat on the heavily stressed portions of the inner barrel wall which protects the latter against the aggressive explosion products. It may well be that the sudden improvement of the life of firearm barrels as obtained with the present method is not caused by the reduction in the losses owing to sliding friction but by a reduction of the detrimental consequences of the usual high sliding friction such as wear, increased danger of erosion and the like.

Having now particularly described and ascertained the nature of my said invention and in what manner the same is to be performed, I declare that what I claim is:

1. Method for increasing the useful life of firearms by the use of friction-reducing surfaces at least at the mutually contacting metallic parts of the inner wall of the firearm barrel and the outer surface of the projectile by the provision of means for producing a gas film between the parts sliding upon each other, comprising arranging the firearm barrel in a nitrogen-containing atmosphere in an electric discharge chamber and connecting the barrel with a source of current to cause it to act at least periodically as the cathode in the electric discharge, subjecting the barrel to an electric glow discharge whereby the inner wall of the barrel is bombarded with gas ions of such intensity that the barrel is heated to a temperature sufficient to promote diffusion and atomic nitrogen is diffused into the metal surface of the inner wall of the barrel, providing a steel projectile with steel driving bands which have been heated in a nitrogen-containing atmosphere to a temperature sufficient to promote diffusion and have thereby been enriched at the surface with diffused nitrogen, whereby at the temperature and surface pressure prevailing on firing, gaseous nitrogen is emitted at least from the contacting metal surface portions of the inner wall of the barrel and the driving bands to produce a gaseous friction-reducing film between such surface portions made up of nitrogen emanating from all such portions.

2. The combination of a firearm barrel and a projectile adapted to be propelled therethrough, said barrel having an inner wall, along which the projectile is guided on firing, whose surface zone is enriched with diffused nitrogen which is at least in part liberated at the temperature and pressure prevailing on firing, and said projectile having steel driving bands whose surface zones are similarly enriched with diffused nitrogen capable of being liberated at the temperature and pressure prevailing during the firing of the projectile in the barrel, whereby the nitrogen released from both the barrel and projectile on firing form a friction-reducing gaseous film between the barrel and projectile.

3. Method for increasing the useful like of a gun barrel, measured by the number of rounds before discard, which comprises treating the inner wall, along which the projectile is guided on firing, in an electric glow discharge in a nitrogen-containing atmosphere to enrich the surface and the zone immediately beneath it with diffused nitrogen which is in part liberated at the temperature and pressure prevailing on firing, similarly treating projectiles provided with steel driving bands to enrich the surfaces of such bands and the zones immediately beneath them with diffused nitrogen capable of being liberated at least in part at the temperature and pressure prevailing on firing, and firing said projectiles through said barrel, whereby a friction-reducing film of gaseous nitrogen emitted by the contacting barrel and projectile surfaces, is formed between such surfaces.

References Cited in the file of this patent

UNITED STATES PATENTS

| 2,398,895 | Schreib | Apr. 23, 1946 |
| 2,701,524 | Van Dine | Feb. 8, 1955 |
| 2,799,959 | Osborn | July 23, 1957 |

FOREIGN PATENTS

| 427,623 | Great Britain | Apr. 23, 1935 |
| 744,753 | Great Britain | Feb. 15, 1956 |